United States Patent
Mishan

(10) Patent No.: US 10,849,464 B2
(45) Date of Patent: Dec. 1, 2020

(54) STICK HANDLE WITH HEAT SHIELD

(71) Applicant: E. MISHAN & SONS, INC., New York, NY (US)

(72) Inventor: Steven Mishan, New York, NY (US)

(73) Assignee: E. Mishan & Sons, Inc., New York, NY (US)

( * ) Notice: Subject to any disclaimer, the term of this patent is extended or adjusted under 35 U.S.C. 154(b) by 161 days.

(21) Appl. No.: 16/182,953

(22) Filed: Nov. 7, 2018

(65) Prior Publication Data

US 2020/0138243 A1 May 7, 2020

(51) Int. Cl.
*A47J 45/08* (2006.01)
*A47J 45/06* (2006.01)

(52) U.S. Cl.
CPC ........... *A47J 45/085* (2013.01); *A47J 45/061* (2013.01)

(58) Field of Classification Search
CPC ......... A47J 45/08; A47J 45/085; A47J 45/061
See application file for complete search history.

(56) References Cited

U.S. PATENT DOCUMENTS

| | | | |
|---|---|---|---|
| 93,271 A | 8/1869 | Bigelow | |
| 979,847 A | 12/1910 | Hammond | |
| 1,317,715 A * | 10/1919 | Luttringhaus | B65D 25/2858 220/768 |
| 1,482,305 A | 1/1924 | Hodgson | |
| 1,512,197 A * | 10/1924 | Borel | A47J 45/08 220/753 |
| 4,209,877 A * | 7/1980 | Colasent | A47J 45/08 2/20 |
| 4,680,829 A * | 7/1987 | Baumgarten | A47J 45/061 220/759 |
| 5,121,848 A * | 6/1992 | Waligorski | A47J 45/061 220/752 |
| D433,278 S | 11/2000 | LoGiudice | |
| D482,568 S | 11/2003 | Demers | |
| D711,188 S * | 8/2014 | Shen | D7/395 |
| 2008/0290104 A1 | 11/2008 | Ng | |
| 2012/0217252 A1 | 8/2012 | Jung | |
| 2013/0037553 A1 | 2/2013 | Bourbeau | |
| 2017/0197755 A1 | 7/2017 | LePinske | |
| 2018/0220849 A1 * | 8/2018 | Votolato | A47J 45/061 |
| 2018/0279837 A1 | 10/2018 | Wang | |
| 2020/0000287 A1 * | 1/2020 | Lam | A47J 45/08 |

OTHER PUBLICATIONS

CMA Buyers Guide to Handles, Handles, Covers & Lids, pp. 21-23.
https://startsat60.com/lifestyle/tips/what-that-hole-in-the-pot-handle-is-really-for; "What that hole in the pot handle is really for", retrieved May 29, 2018.
https://www.consumerreports.org/cro/kitchen-cookware/buying-guide/indix.htm, Best Cookware Buying Guide—Consumer Reports, "Cookware Buying Guide", retrieved May 22, 2018.

* cited by examiner

*Primary Examiner* — Mollie Impink

(74) *Attorney, Agent, or Firm* — Notaro, Michalos & Zaccaria P.C.

(57) ABSTRACT

In an elongated, hollow stick handle for a cooking apparatus, the improvement comprising a heat shield in the form of a metal tab bent over an open end of the stick handle facing the cooking apparatus, for at least partly closing the open end of the stick handle to reduce heating of the stick handle.

8 Claims, 3 Drawing Sheets

STICK HANDLE WITH HEAT SHIELD

FIELD AND BACKGROUND OF THE INVENTION

The present invention relates generally to the field of cookware and, in particular, to a new and useful stick handle for a cooking apparatus with a heat shield for reducing unwanted heating of the handle.

Stick handles for cookware are known. Some include a hollow, elongated body having one end connected to a cooking apparatus and an opposite end to be held by a user. The cooking apparatus may be of the stove-top type like a pot, pan or griddle to be placed on a range or other heated or heat generating device, and includes a cooking surface on which food is to be placed to be cooked. Other cooking apparatus that may include a stick handle are self-heating, for example, using electricity to heat the cooking surface.

In either case, heat is unavoidably transmitted into the hollow handle via an opening in the end of the handle facing the cooking apparatus and this overheats the handle and may burn the user holding the handle.

A need remains for solving this problem.

SUMMARY OF THE INVENTION

According to an embodiment of the subject technology, a hollow stick handle for a cooking apparatus, for example a pot, pan, or griddle, has a main body made of metal, the main body having an open end facing the cooking apparatus; a pair of connecting wings of metal for connecting the main body to the cooking apparatus; and a tab connected to the main body on an edge and having three free edges, the tab bent into the stick handle, the three free edges defining a U-shaped gap between the tab and the main body, to partially close the open end and thereby block at least some of the heat from the cooking apparatus from entering the stick handle.

According to another embodiment of the subject technology, a cooking apparatus, for example a pot, pan, or griddle has a hollow stick handle. The stick handle has a main body made of metal, the main body having an open end facing the cooking apparatus; a pair of connecting wings of metal for connecting the main body to the cooking apparatus; and a tab connected to the main body on an edge and having three free edges, the tab bent into the stick handle, the three free edges defining a U-shaped gap between the tab and the main body, to partially close the open end and thereby block at least some of the heat from the cooking apparatus from entering the stick handle.

It is an object of the present invention to provide a stick handle for a cooking apparatus that is hollow but that solves the problem of overheating by providing a heat shield that at least partly closes the open end of the stick handle facing the cooking apparatus, to block at least some of the radiant and/or convection heat coming from the cooking apparatus, from entering the handle.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

Figure 1:
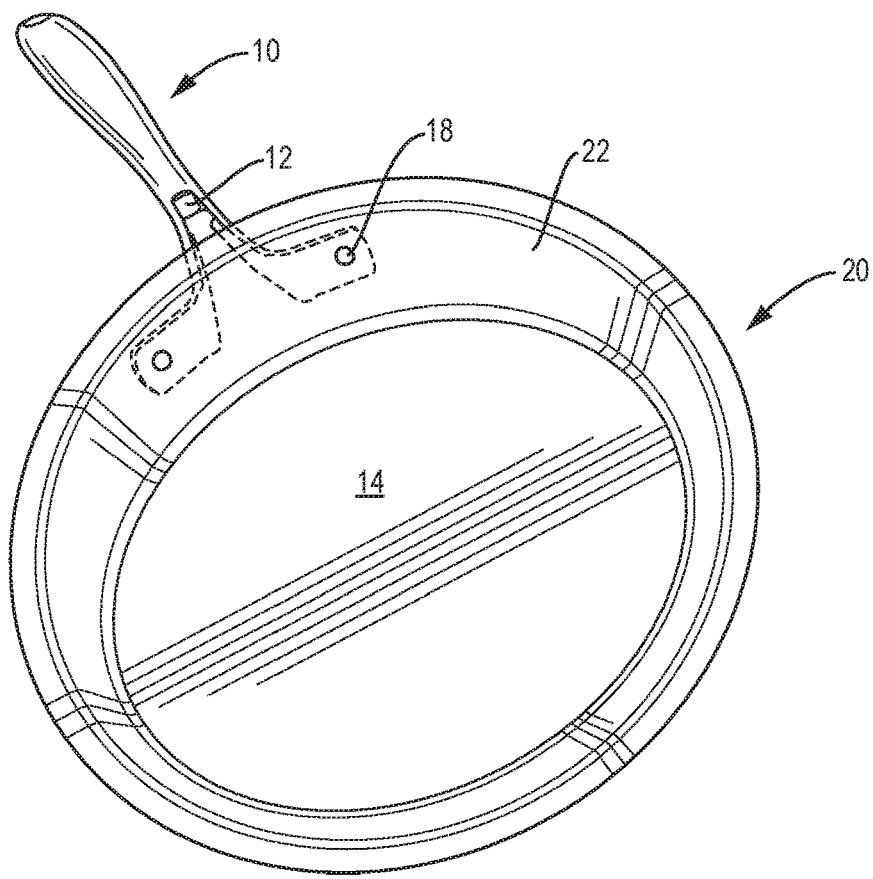
FIG. 1 is a perspective view of an embodiment of the invention for a cooking apparatus in the form of a pan for stove-top use.

Referring now to the drawings, in which like reference numerals are used to refer to the same or similar elements, FIG. 1 shows an elongated, hollow stick handle 10 for a cooking apparatus 20 such as a stove-top or electrically heated pot, pan, griddle or other cooking apparatus having a cooking surface 14 on which food to be heated is placed. Such hollow stick handles 10 have an open end facing the cooking apparatus into which heat from the cooking apparatus, including radiant and convection heat, can enter to overheat the handle and possibly burn the user of the apparatus.

The improvement comprises a heat shield 12 that at least partly closes the open end of the stick handle facing the cooking apparatus, to at least partly block heat from entering the handle and thus keep the handle cooler for use.

Figure 2:
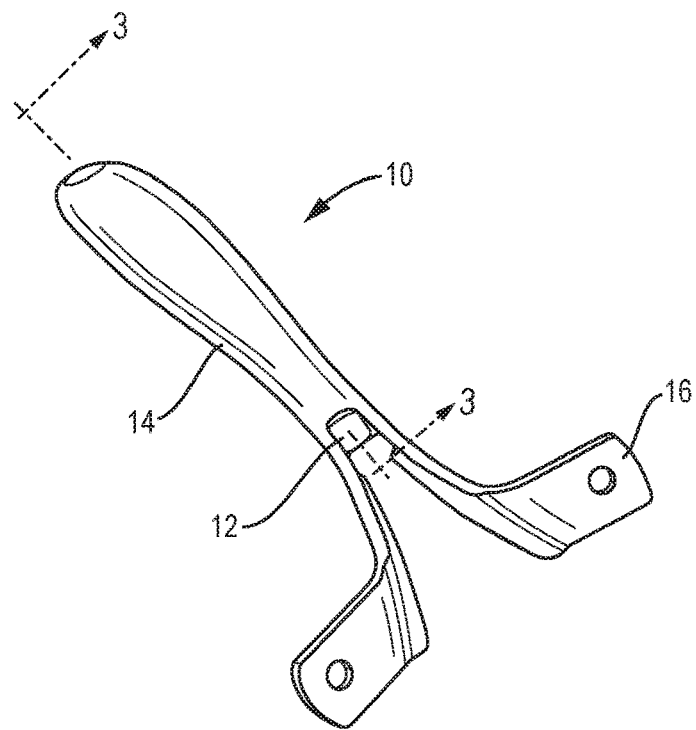
FIG. 2 is a top perspective view of the elongated hollow handle of the invention without the cooking apparatus attached.
Figure 3:
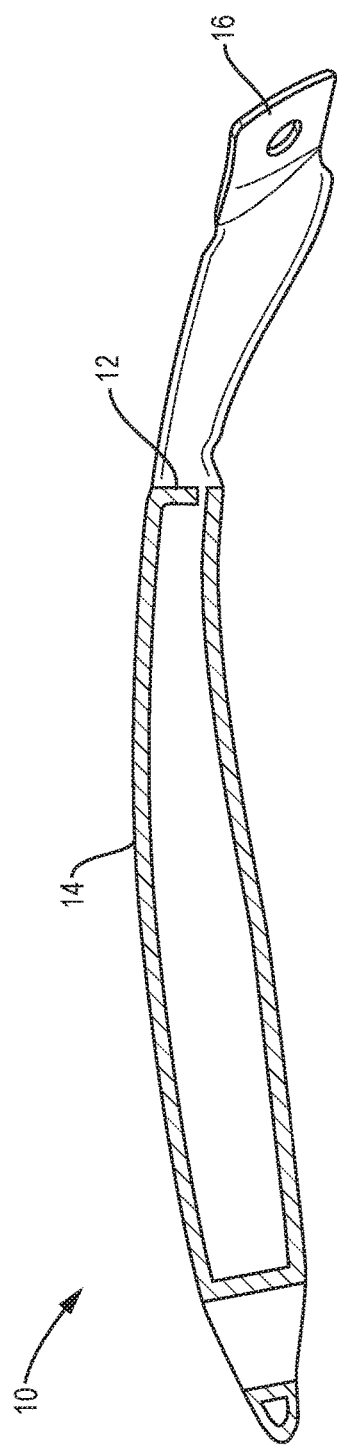
FIG. 3 is a side sectional view taken along line 3-3 of FIG. 2
Figure 4:
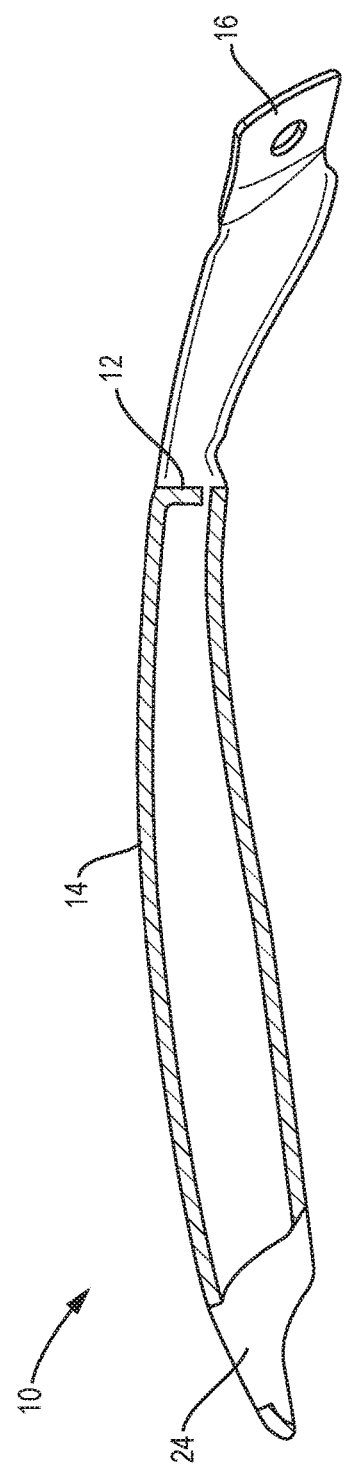
FIG. 4 is a view similar to FIG. 3 of another embodiment of the stick handle.

The improvement in the stick handle 10, as shown in FIGS. 2, 3 and 4 includes the handle being made of a body 14, preferably but not exclusively of metal, with the heat shield comprising a tab 12, again preferably of metal connected to the preferably metal body, and being bent down over the opening, and a pair of connecting wings 16 connected to the body and being connected to the cooking apparatus for connecting the stick handle to the cooking apparatus. This connection can be in the form of rivets 18 that extend through aligned holes in the wings 16 and cooking apparatus wall 22, for securing the handle 10 to the cooking apparatus 20.

Figure 5:
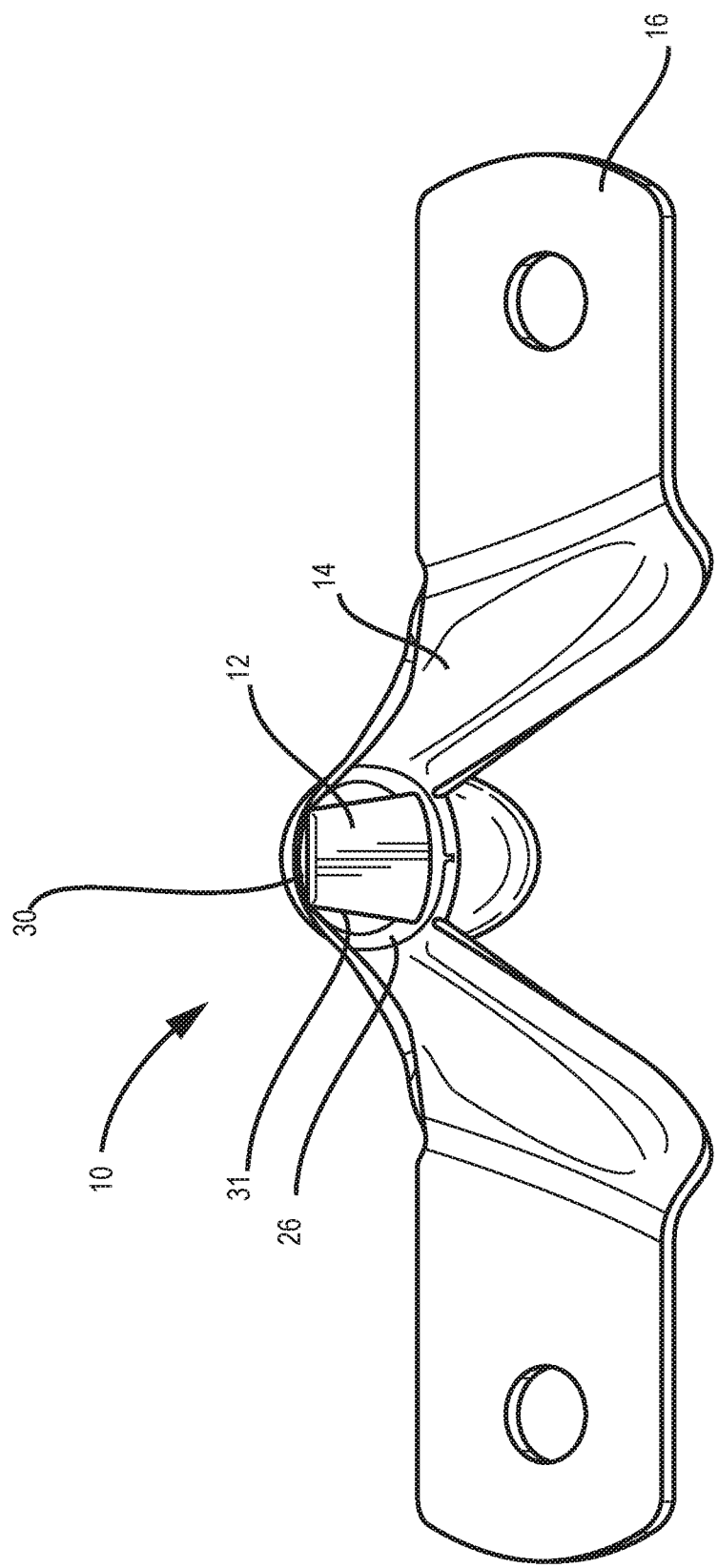
FIG. 5 is a front elevational view of the stick handle of FIG. 3 or 4, without the cooking apparatus attached, for better showing the tab of the invention that forms a heat shield, in position over an open end of the handle.

As best shown in FIG. 5, the tab 12 leaves some space 26 around the open end of the handle 10, so that air can expand due to heating and leave the hollow handle. Conversely the space allows air to reenter the handle upon cooling. As shown in FIG. 5, tab 12 is bent into the stick handle and is connected on an edge 30 to the main body 14, leaving three free edges 31 (only one is numbered in FIG. 5), which define a U-shaped gap between the tab 12 and main body 14.

FIG. 4 shows another embodiment of the improvement that also includes an opening 24 at the opposite end of the hollow handle 10. This allows a freer circulation of air through the hollow handle to further improve the heat shielding effect of the tab 12.

While specific embodiments of the invention have been shown and described in detail to illustrate the application of the principles of the invention, it will be understood that the invention may be embodied otherwise without departing from such principles.

What is claimed is:

1. In an elongated, hollow stick handle (10) having a main body attached to a cooking apparatus (20), the improvement comprising:

a heat shield (12) at least partly closing an open end of the stick handle facing the cooking apparatus, the heat shield comprising a tab connected to the main body on an edge and having three free edges, the tab bent into the stick handle, the three free edges defining a U-shaped gap between the tab and the main body.

2. The improvement of claim 1 wherein the stick handle is made of metal and the tab is made of metal.

3. The improvement of claim 1 wherein the tab only partly covers the open end.

4. The improvement of claim 1 wherein the stick handle further comprises a pair of connecting wings connected to the main body for connecting the stick handle to the cooking apparatus.

5. The improvement of claim 1 wherein the stick handle has a second opening on a second end of the main body opposite from the open end.

6. The improvement of claim 1 wherein the stick handle has an opposite open end in addition to the open end facing the cooking apparatus, the stick handle being made of metal and the tab being made of metal bent over the first mentioned open end and leaving a space in the first mentioned open end around the tab.

7. A hollow stick handle for a cooking apparatus, the stick handle comprising:

a main body made of metal, the main body having an open end facing the cooking apparatus;

a pair of connecting wings of metal for connecting the main body to the cooking apparatus; and a tab connected to the main body on an edge and having three free edges, the tab bent into the stick handle, the three free edges defining a U-shaped gap between the tab and the main body, to partially close the open end and thereby block at least some of the heat from the cooking apparatus from entering the stick handle.

8. A cooking apparatus having a hollow stick handle connected thereto, the stick handle comprising:

a main body made of metal, the main body having an open end facing the cooking apparatus;

a pair of connecting wings of metal for connecting the main body to the cooking apparatus; and a tab connected to the main body on an edge and having three free edges, the tab bent into the stick handle, the three free edges defining a U-shaped gap between the tab and the main body, to partially close the open end and thereby block at least some of the heat from the cooking apparatus from entering the stick handle.

* * * * *